H. N. Smith.
Seed Dropper.
N° 110,688. Patented Jan. 3, 1871.
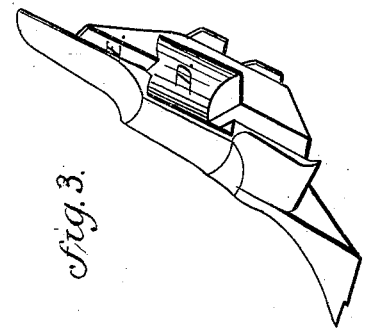
Fig. 3.
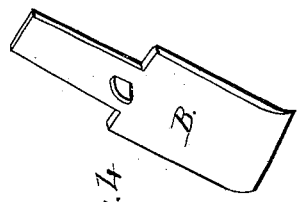
Fig. 4.
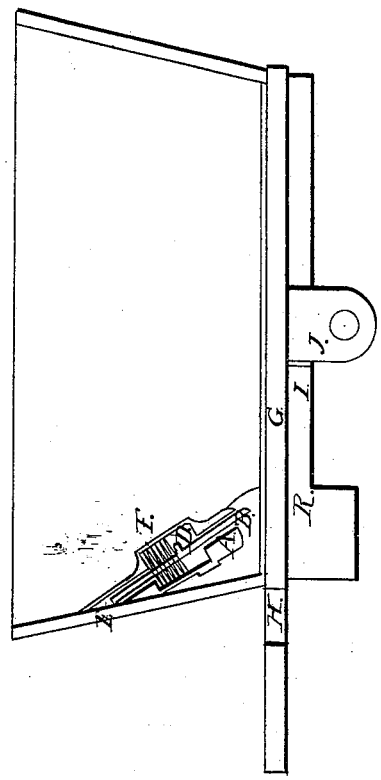
Fig. 1.
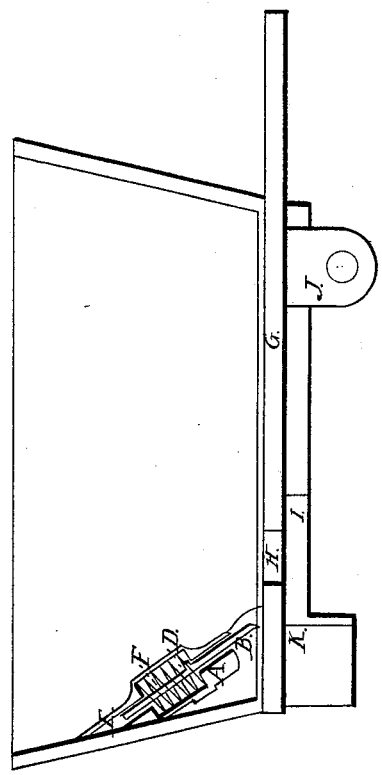
Fig. 2. Section
Inventor:
H. N. Smith

United States Patent Office.

HIRAM MOORE SMITH, OF RICHMOND, VIRGINIA.

Letters Patent No. 110,688, dated January 3, 1871.

IMPROVEMENT IN SEED-DROPPERS.

The Schedule referred to in these Letters Patent and making part of the same.

I, HIRAM MOORE SMITH, of the city of Richmond, in county of Henrico and State of Virginia, have invented an Improved Scraper or Cut-off for Corn-Planters and other Seed-Droppers.

The nature and object of my invention consist in supplying a flexible metallic scraper or cut-off, to work over the cavities in which the corn or other seed is measured, whether the cavities are in a reciprocating slide or in a rotating disk-plate or cylinder, to take the place of brushes and elastic substances heretofore used, and to furnish a more perfect and accurate cut-off than the brush will afford, as well as a more durable and reliable fixture.

Description of the Accompanying Drawing.

Figure 1 represents a half-size horizontal section of seed-hopper as used by me for corn-planter, with reciprocating slide in the bottom, and with the scraper or cut-off affixed over the slide, all represented as cut through the middle.

Figure 2 is also a section through the center, but showing the slide thrown forward to receive the seed.

Figure 3 is a perspective of one-half of scraper-case, with scraper and spring removed, showing interior of barrel for holding the spring, and groove for the scraper-gate to slide in.

Figure 4 is the gate, removed from the case.

A, fig. 1, is section through the center of metallic scraper-case.

B, gate, sliding in grooves, the part below the spring $\frac{7}{8}$ wide, or so wide as to cover the cavity in slide, the upper part reduced in width to pass free through the spring, and long enough to be again supported in groove above the spring.

D, barrel to receive the spiral spring.

E, groove for scraper-gate to work in.

F, spring.

G, reciprocating slide.

H, cavity for seed.

I, bottom of hopper forming bottom of cavity H.

j, projection from slide, one-half inch thick, extending down through opening in bottom of hopper, to connect by pitman with driving-crank.

Fig. 2 shows the slide forward in hopper, with cavity H ready to receive the seed.

Fig. 1 shows the slide drawn back with the seed discharged; fig. 1 also shows the scraper-gate E raised, the spring compressed, as passing over a grain of corn projecting above the face of the slide. The bottom of hopper is removed at K, so that the seed drops at that point, while the slide is moving fast. To scatter the grains or elongate the hill, I continue the bottom to the extent of the hopper, so that the grains will drop gradually over the edge of the bottom as the crank is approaching its dead-point.

What I claim as my invention, and desire to secure by Letters Patent, is—

The herein-described construction and arrangement of the scraper-barrel A D, spring F, and scraper B, as specified, when used in combination with reciprocating slide or cylindrical seed-dropper.

H. M. SMITH.

Witnesses:
  A. MOORE,
  JAMES S. GRINNELL.